United States Patent [19]

Kojima

[11] Patent Number: 4,961,161
[45] Date of Patent: Oct. 2, 1990

[54] ARITHMETIC PROCESSOR PERFORMING MASK AND TRAP OPERATIONS FOR EXCEPTIONS

[75] Inventor: Shingo Kojima, Tokyo, Japan

[73] Assignee: NEC Corporation, Tokyo, Japan

[21] Appl. No.: 271,832

[22] Filed: Nov. 16, 1988

[30] Foreign Application Priority Data

Nov. 16, 1987 [JP] Japan ................................. 62-289912

[51] Int. Cl.⁵ .............................................. G06F 7/00
[52] U.S. Cl. ................................................. 364/736.5
[58] Field of Search ..... 364/736.5, 748, 200 MS File, 364/900 MS File, 736, 761

[56] References Cited

U.S. PATENT DOCUMENTS 4,460,970 7/1984 McClary ............................. 364/761
4,777,593 10/1988 Yoshida .............................. 364/200

OTHER PUBLICATIONS

ANSI/IEEE Std 754-1985, "IEEE Standard for Binary Floating-Point Arithmetic", IEEE, 1985, pp. 7-18.

Primary Examiner—Gary V. Harkcom
Assistant Examiner—Long T. Nguyen
Attorney, Agent, or Firm—Foley & Lardner, Schwartz, Jeffery Schwaab, Mack, Blumenthal & Evans

[57] ABSTRACT

A floating-point arithmetic processor performs a MASK or TRAP operation in response to occurrence of an exception. This processor includes a first flag which is set when the exception occurs, a second flag storing first data designating the MASK operation or second data designating the TRAP operation. A third flag is set when the first flag is set and the second flag is storing the second data. A controller produces a default value in response to the occurrence of the exception. The processor also includes a destination register, which is accessible by a central processing unit (CPU), and a transfer gate circuit which takes an open state to allow the default value to be stored into the destination register when the third flag is not set and a closed state to inhibit the default value to be stored into the destination register when the third flag is set.

7 Claims, 3 Drawing Sheets

ARITHMETIC PROCESSOR PERFORMING MASK AND TRAP OPERATIONS FOR EXCEPTIONS

BACKGROUND OF THE INVENTION

The present invention relates to a digital data processor and, more particularly, to a floating-point arithmetic processor (called hereinafter "FPP") in which an operation for exceptions is required.

An FPP performs high speed arithmetic operations such as ADD, SUBTRACT, MULTIPLY, DIVIDE, SQUARE ROOT, ROUND, etc., on one or more floating-point data, in place of a CPU (Central Processing Unit). Exceptional conditions such as Overflow and Underflow may arise during an arithmetic operation. Moreover, a SQUARE ROOT arithmetic operation calculating a square root of a negative number and a DIVIDE arithmetic operation performing a division by zero, i.e. Invalid-Operation and Division-by-zero exceptions may also occur. The FPP is thus required to perform an operation responsive to the occurrence of those exceptions.

According to the standard for floating-point arithmetic defined by IEEE, "ANSI/IEEE Std 754-1985", a MASK operation or TRAP operation is requested as the operation responsive to the occurrence of Overflow, Underflow, Invalid-Operation and Division-by-Zero exceptions. The MASK operation is to mask the occurrence of any exception. That is, even if the exception occurs, the FPP does not inform the CPU of the exception occurrence, so that the CPU continues to execute subsequent operations assuming no exception has occurred in the FPP. Since the exception has occurred in the FPP, however, the FPP writes a default value corresponding to the occurring exception into a destination register which may be accessed by the CPU to read data therefrom as a result of an arithmetic operation sent to the FPP. On the other hand, the TRAP operation is to supply an interruption request signal to the CPU when any exception occurs in the FPP. The CPU responds the interruption request signal thus supplied to suspend the execution of the subsequent operations and then to perform a processing operation for exceptions. Since the CPU performs the operation for exceptions, the content of the destination register should not be written with any default value to protect the destination register.

Thus, the MASK operation requires writing the default value into the destination register, whereas the TRAP operation requires protecting the current content of the destination register. Moreover, the MASK and TRAP operations should be designed to be selectable. For these reasons, the FPP according to prior art requires a complicated microprogram, so that high speed operation responsive to the occurrence of exceptions is not realized.

SUMMARY OF THE INVENTION

Therefore, an object of the present invention is to provide a floating-point arithmetic processor for performing an operation responsive to the occurrence of exceptions at a high speed.

Another object of the present invention is to provide a processor equipped with a simplified microprogram for exception operations.

Still another object of the present invention is to provide an FPP equipped with a hardware for processing a TRAP operation.

A processor according to the present invention comprises a first flag which is set when an exception occurs, a second flag stored with first information representative of a MASK operation or second information representative of a TRAP operation, a third flag, a flag control circuit coupled to the first and second flags for setting the third flag when the first flag is set and the second flag is stored with the second information, a destination register, a controller producing a default value when the exception occurs, and means for transferring the default value to the destination register to write the default value into the destination register when the third flag is not set and for inhibiting the default value from being transferred to the destination register to protect the destination register when the third flag is set.

The protection of the destination register in the TRAP operation is thus performed by hardware, not by using a substantial microprogram. The microprogram is sufficient for the MASK operation and thus requires no complicated description. Accordingly, the operation for exceptions is executed at a high speed.

BRIEF DESCRIPTION OF THE DRAWINGS

The above and other objects, advantages and features of the present invention will be more apparent from the following description taken in conjunction with the accompanying drawings, in which.

DETAILED DESCRIPTION OF THE PREFERRED EMBODIMENT

Figure 1:
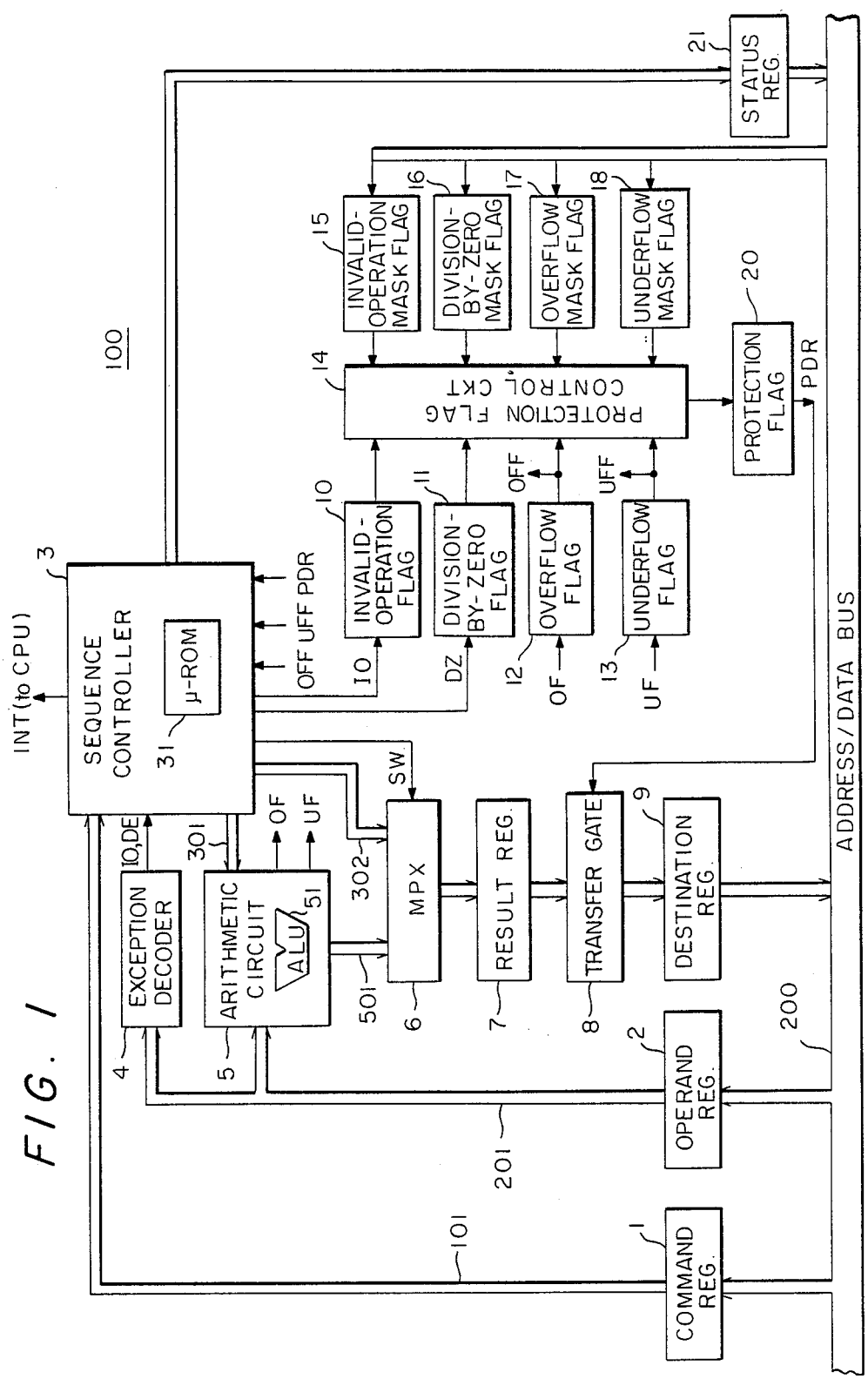
FIG. 1 is a block diagram representative of an embodiment of the present invention.

Referring to FIG. 1, a floating-point arithmetic processor (FPP) 100 according to an embodiment of the present invention is coupled to a CPU (not shown in the drawing) via an address/data bus 200. When the CPU requests the FPP 100 to execute a floating-point arithmetic operation, it writes a command code into a command register 1 and one or more operand data into an operand register 2. Moreover, in order to designate the kind of exception operation, i.e. in order to designate the MASK operation or TRAP operation, flag data is stored by the CPU into an Invalid-Operation mask flag 15, a Division-by-Zero mask flag 16, an Overflow mask flag 17 and an Underflow mask flag 18, respectively. In this embodiment, the flag data of "1" designates the MASK operation, whereas the flag data of "0" designates the TRAP operation. The MASK or TRAP operation is thereby selectable by a user.

The command code stored in the command register 1 is transferred via an internal bus 101 to a sequence controller 3 including a micro-ROM 31 storing a microprogram for an arithmetic operation and a MASK operation. The operand data stored in the operand register 2 are transferred via an internal bus 201 to an arithmetic circuit 5 including an ALU (arithmetic and logic unit) 51. Since the Invalid-Operation exception and Division-by-Zero exception can be detected from the operand data, the operand data are further transferred to an exception decoder 4 which supplies signals IO and DZ to the controller 3. The signal IO takes an active level when the Invalid-Operation exception occurs and the signal DZ takes an active level when the Division-by-Zero exception occurs. When the signals IO and DZ take the active level, the controller 3 sets an Invalid-Operation Flag 10 and a Division-by-Zero flag 11 by writing flag data of "1", respectively.

In response to the command code, the controller 3 supplies instruction data to the arithmetic circuit 5 via an instruction bus 301 to designate the arithmetic operation to be performed by the circuit 5. When an Overflow or Underflow exception occurs during an arithmetic operation, the arithmetic circuit 5 changes a signal OF or UF to an active level. An Overflow flag 12 and an Underflow flag 13 are thereby set to be written with flag data of "1", respectively.

When any one of the Invalid-Operation, Division-by-Zero, Overflow and Underflow exceptions occurs, the controller produces a default value corresponding to the occurring exception, whose value is transferred via a bus 302 and a multiplexer 6 to a result register 7 to be written thereinto. When no exception occurs, on the other hand, the arithmetic result produced by the arithmetic circuit 5 is written into the result register 7 via a bus 501 and the multiplexer 6. The multiplexer 6 is controlled by a switching signal SW from the controller 3. The data stored in the result register 7 is transferred to a destination register 9 when no exception occurs or when the exception occurs in the MASK operation designation mode. The CPU (not shown) can make access to the register 9 to read out the content thereof. On the other hand, when the exception occurs in the TRAP operation designation mode, the data stored in the result register 7 is inhibited from being transferred to the destination register 9 to protect the content thereof.

For this purpose, a transfer gate 8 is inserted between the result and destination registers 7 and 9 in accordance with the present invention. The open and closed states of the transfer gate 8 are controlled by the flag data PDR from a protection flag 20 which is in turn controlled by a protection flag control circuit 14, the protection flag 20 and the control circuit 14 being also provided in accordance with the present invention. The control circuit 14 receives the flag data from the flags 10 to 13 and the mask flags 15 to 18 and sets the protection flag 20 when any one of the flags 10 to 13 is set with the associated mask flag 15, 16, 17 or 18 storing the flag data of "0". In other words, the control circuit 14 sets the protection flag 20 when the exception occurs in the TRAP operation designation mode. When the protection flag 20 is set, i.e. when the flag data PDR takes a "1", the transfer gate 8 is brought into the closed state. The data of the result register 7 is thereby inhibited from being transferred to the destination register 9, so that the content of the register 9 is protected. When the protection flag 20 is not set, the transfer gate 8 is brought into the open state to allow the data of the result register 7 to be transferred to the destination register 9. The flag data PDR from the protection flag 20 is further supplied to the sequence controller 3. When the flag data PDR takes "1", the controller 3 generates an interruption request signal INT and supplies it to the CPU (not shown) to inform it that the exception has occurred. In order that the controller 3 further informs the CPU that which exception has occurred, it writes into a status register 21 status information corresponding the occurring exception. When no exception occurs, the register 21 is written with status information representative of an execution condition of the arithmetic circuit 5. When the CPU reads out the status information from the status register 21 in response to the interruption request signal INT, the flags 10 to 13 and 20 are reset.

Figure 2:
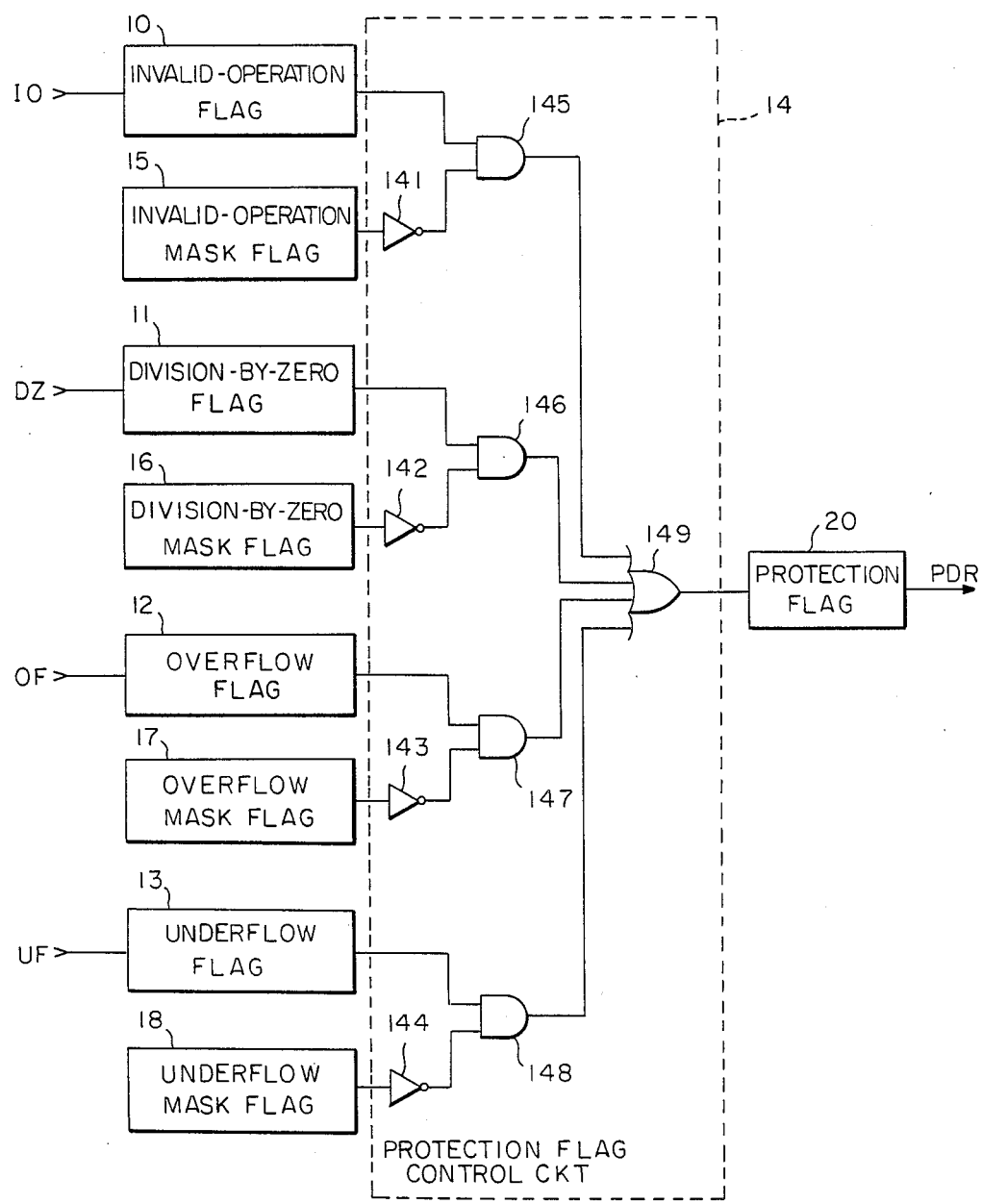
FIG. 2 is a circuit diagram representative of a protection flag control circuit shown in FIG. 1.

Referring to FIG. 2, the protection flag control circuit 14 includes four inverters 141 to 144, four AND gates 145 to 148 and one OR gate 149 which are connected as shown. The inverters 141 to 144 invert the mask flag data of the mask flags 15 to 18, respectively. Therefore, when an exception occurs, which is designated as the TRAP operation, the protection flag 20 is set to produce the protection flag data PDR of "1".

An operation of the FPP 100 shown in FIG. 1 will be described below with reference to FIGS. 2 and 3. When the FPP 100 receives the arithmetic operation request from the CPU, the microprogram stored in the micro-ROM 31 starts to be executed, so that the following processing steps are performed in accordance with the flow chart shown in FIG. 3. First, the sequence controller 3 makes access to the command register to read a command code therefrom (step 301). The operand register 2 is thereafter accessed, so that one or more operand data stored therein are transferred to the arithmetic circuit 5 and the exception decoder 4 (step 302). The exception decoder 4 detects the value of the operand data and supplies the active level signal IO to the controller 3 when the value of the operand data is a negative number. When the value of the operand data is zero, the decoder 4 supplies the active level signal DZ to the controller 3. In response to the signals IO and DZ and the command code, the controller 3 judges whether or not the Invalid-Operation exception and Division-by-Zero exception occur (step 301). That is, when the signal IO takes the active level and the command code represents a SQUARE ROOT arithmetic operation, the Invalid-Operation exception occurs. When the signal DZ takes the active level and the command code represents a DIVIDE arithmetic operation, the Division-by-Zero exception occurs. Assuming that the Invalid-Operation exception occurs, the controller 3 sets the flag 10 (step 304). In a case of occurrence of the Division-by-Zero exception, the flag 11 is set by the controller 3 (step 304). The sequence controller 3 thereafter writes a default value corresponding to the Invalid-Operation or Division-by-Zero exception into the result register 7 via the multiplexer 6 (Step 308) without judging which one of the MASK and TRAP operations is designated, in accordance with the present invention. Subsequently, the controller 3 writes into the status register 21 status information representative of the occurrence of the Invalid-Operation or Division-by-Zero exception (Step 311), followed by execution of Step 312. In this Step 312, the controller 3 instructs the result register 7 to transfer the data thereof to the destination register 9. When the protection flag data PDR is "1", however, the Step 312 is not executed substantially. More specifically, assuming that the Invalid-Operation and Division-by-Zero mask flags 15 and 16 have been stored with data of "0" to designate the TRAP operation, the protection flag 20 is set in response to the set condition of the flag 10 or 11, as described hereinbefore with reference to FIG. 2. The protection flag data PDR thereby takes "1" at a time of execution of Step 304. By the flag data PDR of "1", the transfer gate 8 is brought into the closed state to inhibit the data transfer from the result register 7 to the destination register 9. The content of the destination register 7 is thereby protected. Moreover, the interruption request signal INT is generated by a hardware construction using a flip-flop circuit, for example, and is then supplied to the CPU (not shown), in response to the flag data PDR of "1". Thus, the TRAP operation responsive to the exception occurrence is performed, in which the interrupt request to the CPU is generated for an operation for exceptions while protecting the content of the destination register 9. When the mask flags 15 and 16 are stored with "1" to designate the MASK operation, the protection flag 20 is not set even when the flags 10 and 11 are set. The flag data PDR is thereby "0", so that the transfer gate 8 is in an open state to allow the execution of Step 312. The default value is thereby written into the destination register 9. No interruption request signal INT is generated. Thus, the MASK operation responsive to the exception occurrence is performed.

When it is judged in Step 303 that any one of the Invalid-Operation and Division-by-Zero exceptions does not occur, the controller 3 supplies the instruction data to the arithmetic circuit 5 via the bus 301 to instruct the circuit 5 to perform the arithmetic operation (Step 305). The controller 3 waits for the completion of the arithmetic operation (Step 306). During the arithmetic operation, if the Overflow or Underflow exception occurs, the arithmetic circuit 5 produces the signal OF representative of the Overflow exception or the signal UF representative of the Underflow exception. These signals OF and UF are supplied to the flags 12 and 13 to set them. When the arithmetic operation by the circuit 5 ends, the controller 3 judges the flag data OFF and UFF of the flags 12 and 13 to detect the occurrence of the Overflow or Underflow exception (Step 307). If the Overflow or Underflow exception has occurred, Steps 308 and 311 are executed, followed by execution of Step 312. However, in the case where the mask flags 17 and 18 have been stored with data of "0", Step 312 is not executed as described hereinbefore. Thus, either one of the MASK and TRAP operations responsive to the occurrence of Overflow and Underflow exceptions is performed.

When one of the Overflow and Underflow exceptions does not occur, the arithmetic result derived from the arithmetic circuit 5 is stored into the result register 7 via the bus 501 and the multiplexer 6 (Step 311). The status information representative of execution conditions of the arithmetic circuit 5 is thereafter stored into the status register 21 (Step 311), follow by storing the data of the result register 7, i.e. the arithmetic result, into the destination register 9 via the transfer gate 8 (Step 312).

Figure 3:
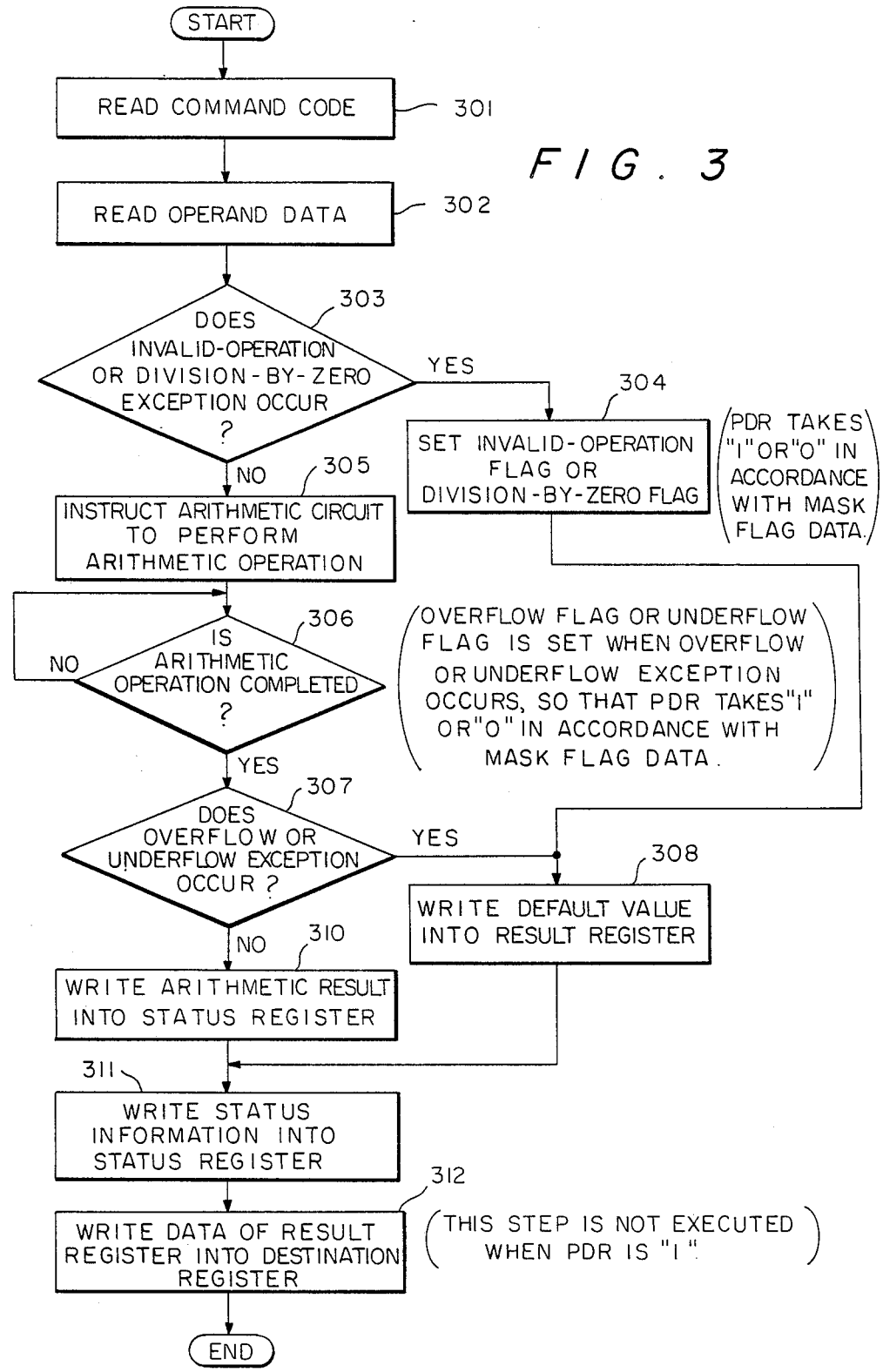
FIG. 3 is a flow chart representative of a microprogram for an operation for processing exceptions.

As described hereinbefore and shown in FIG. 3, the microprogram stored in the micro-ROM 31 includes no step for judging which one of the MASK and TRAP operations is designated. The TRAP operation is performed substantially by a hardware construction without employing substantial software. Accordingly, the FPP 100 includes a simplified microprogram and performs operations responsive to the execution occurrence at a high speed.

The present invention is not limited to the above embodiment, but may be changed and modified without departing from the scope and spirit of the invention. For example, the transfer gate 8 can be inserted on a write-request control signal line from the controller 3 to the destination register 9 with direct-coupling of the output node of the result register 7 to the input node of the destination register 9. In this case, the closed state of the gate 8 inhibits the write-request signal from being supplied from the controller 3 to the destination register 9, so that the content of the destination register 9 is protected in the TRAP operation mode. Moreover, the result register 7 may be omitted since the default value is not stored into the destination register 9 in the TRAP operation mode. The interruption request signal INT can be generated in response to the output of the protection flag control circuit 14 in place of flag data PDR.

What is claimed is:

1. A data processor in which an exception may occur during an arithmetic operation, said data processor comprising:
    a first flag register which is set in response to occurrence of said exception,
    a second flag register storing either one of first and second data, said first data designating a first operation responsive to occurrence of said exception and said second data designating a second operation responsive to occurrence of said exception,
    a third flag register,
    first means, coupled to said first and second flag registers, for setting said third flag register when said first flag register is set and said second flag register is storing said first data,
    a destination register,
    second means for producing a default value in response to occurrence of said exception, and
    third means, coupled to said destination register and said second means, for writing said default value into said destination register when said third flag register is not set and for inhibiting said default value from being written into said destination register when said third flag register is set.

2. A data processor as claimed in claim 1, wherein said third means includes a transfer gate circuit coupled between said second means and said destination register, said transfer gate circuit being in an open state to allow said default value to be transferred to said destination register when said third flag register is not set and in a closed state to inhibit said default value from being transferred to said destination register when said third flag register is set.

3. A data processor as claimed in claim 2, wherein said first means includes a logic gate circuit, said logic gate circuit responding to a set output of said first flag register and said first data to set said third flag register.

4. A data processor as claimed in claim 1, further comprising means for producing an interrupt request signal representative of an occurrence of said exception when said third flag register is set.

5. A processor comprising:
    a first register temporarily storing operand data,
    producing means, responsive to said operand data, for producing a first signal representative of occurrence of a first exception,
    an arithmetic circuit performing an arithmetic operation on said operand data, said arithmetic circuit producing, when a second exception occurs, a second signal representative of occurrence of said second exception,
    a first flag register set by said first signal,
    a second flag register set by said second signal,
    a third flag register temporarily storing either one of first and second data, said first data designating a mask operation in which an interruption request signal is not generated, said second data designating a trap operation in which said interruption request signal is generated when one of said first and second exceptions occurs, a fourth flag register temporarily storing either one of said first and second data, a fifth flag register, setting means, coupled to said first, second, third, fourth, and fifth flag registers, for setting said fifth flag register when said first flag register is set and said third flag register is storing said second data or when said second flag register is set and said fourth flag register is storing said second data, default producing means for producing a default value in response to one of said first and second signals, a second register, storing means for storing said default value into said second register when said fifth flag register is not set, and inhibit means for inhibiting said default value from being stored into said second register and for generating said interruption request signal when said fifth flag register is set.

6. A processor as claimed in claim 5, wherein said arithmetic circuit produces result data based on said arithmetic operation, said processor further comprising means for storing said result data into said second register when both of said first and second signals are not produced.

7. A floating-point arithmetic processor to be coupled to a central processing unit, said floating-point arithmetic processor comprising:

detection means for detecting occurrence of an exception during an arithmetic operation and for producing a detection signal, a first flag register temporarily storing either a first signal or a second signal, said first signal designating a mask operation wherein occurrence of said exception is not notified to said central processing unit and said second signal designating a trap operation wherein occurrence of said exception is notified to said central processing unit, a second flag register storing said detection signal, which is produced when said first flag register stores said second signal, a register which is accessible by said central processing unit, a controller generating a default value in response to said detection signal and controlling said register such that said default value is stored into said register, and inhibit means, provided independently of said controller and responsive to said detection signal stored in said second flag register, for inhibiting storage of said default value into said register such that a content of said register is protected.

* * * * *